United States Patent
Braunheim

(10) Patent No.: US 11,130,081 B2
(45) Date of Patent: Sep. 28, 2021

(54) FILTER DEVICE

(71) Applicant: Mahle International GmbH, Stuttgart (DE)

(72) Inventor: Michael Braunheim, Goeppingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/721,891

(22) Filed: Dec. 19, 2019

(65) Prior Publication Data

US 2020/0197841 A1 Jun. 25, 2020

(30) Foreign Application Priority Data

Dec. 20, 2018 (DE) .................... 102018222578.8

(51) Int. Cl.
| | |
|---|---|
| *B01D 29/96* | (2006.01) |
| *B01D 36/00* | (2006.01) |
| *B01D 29/21* | (2006.01) |
| *B01D 35/00* | (2006.01) |

(52) U.S. Cl.
CPC ............. *B01D 29/96* (2013.01); *B01D 29/21* (2013.01); *B01D 35/005* (2013.01); *B01D 36/006* (2013.01); *B01D 2201/295* (2013.01); *B01D 2201/4053* (2013.01)

(58) Field of Classification Search
CPC .................. B01D 29/96; B01D 35/005; B01D 2201/291; B01D 2201/4046; B01D 2201/4053; B01D 2201/42
See application file for complete search history.

(56) References Cited

U.S. PATENT DOCUMENTS

| | | | |
|---|---|---|---|
| 6,101,996 A * | 8/2000 | Arita ..................... | B01D 29/21 123/196 A |
| 2018/0333670 A1* | 11/2018 | Zinic ................. | B01D 46/0015 |

FOREIGN PATENT DOCUMENTS

| | | |
|---|---|---|
| DE | 10 2009 050 158 A1 | 4/2011 |
| DE | 10 2010 005 980 A1 | 8/2011 |
| DE | 10 2017 011 080 A1 | 6/2019 |
| EP | 2 995 358 A1 | 3/2016 |
| WO | WO-2017129417 A1 * | 8/2017 ......... B01D 46/2411 |

OTHER PUBLICATIONS

Jensen, Hans—DE 10 2009 050 158 A1 Machine Translation—2011 (Year: 2011).*
English abstract for DE-10 2010 005 980.
English abstract for DE-10 2017 011 080.
European Patent Office Search dated Mar. 31, 2020 for copending application EP 19 21 7126.

* cited by examiner

*Primary Examiner* — Bradley R Spies
(74) *Attorney, Agent, or Firm* — Fishman Stewart PLLC

(57) ABSTRACT

A filter device may include a filter housing and a ring filter element arranged upright in the filter housing in an installed state. The ring filter element may include an upper end disc, a lower end disc, and at least two projecting pins, each of which in the installed state may engage in an associated draining passage. One of the connecting pins may be arranged offset relative to another of the connecting pins by at least 120° in a circumferential direction of the ring filter element.

20 Claims, 2 Drawing Sheets

FILTER DEVICE

CROSS-REFERENCE TO RELATED APPLICATIONS

This application claims priority to German Patent Application No. DE 10 2018 222 578.8, filed on Dec. 20, 2018, the contents of which are hereby incorporated by reference in their entirety.

TECHNICAL FIELD

The present invention relates to a filter device having a ring filter element that is arranged upright in a filter housing, which ring filter element comprises an upper and a lower end disc. The invention additionally relates to a ring filter element for such a filter device.

BACKGROUND

A generic filter device is thoroughly known and can be found in almost all modern motor vehicles, employed for example as oil or fuel filter.

For servicing, known liquid filter devices usually comprise a draining passage, via which liquid still present in the filter housing can be drained and prevented from undesirably draining into the surroundings. In the state of the art, the draining passage is normally closed with a pin on the ring filter element. In the case of a skewed position of the liquid filter device however it can happen during the change of the ring filter element that the liquid filter device is not completely drained and contaminations of the surfaces on the clean side occur which subsequently reach the engine where they cause damage.

Moreover, in order to be able to ensure a perfect filtering effect it is important for the manufacturers of such filter devices that only filter elements authorised or produced by themselves are inserted. For when using filter elements of non-original makes or imitations, it is not only the filtering performance that is negatively affected but damage are also caused on the filter device at the same time. On the other hand it is desirable to be able to produce and offer filter elements for such filter devices as cost-effectively as possible.

SUMMARY

The present invention therefore deals with the problem of stating an improved or at least an alternative embodiment for a filter device of the generic type which simplifies in particular the maintenance.

According to the invention, this problem is solved through the subjects of the independent claims. Advantageous embodiments are subject of the dependent claims.

The present invention is based on the general idea of now providing at least two draining passages instead of merely a single draining passage, which in the operating state are closed off by two pins which axially and eccentrically project from a ring filter element. The at least two draining passages are offset by at least 120° in the circumferential direction of the ring filter element so that even in the event of a skewed position of the filter device, draining without problem that is also quick at the same time is made possible. The filter device according to the invention has a ring filter element that is arranged upright in a filter housing, which ring filter element comprises an upper end disc and a lower end disc. According to the invention it is provided that the ring filter element comprises at least two projecting, connecting pins which in the installation state both engage in an associated draining passage each and that the second pin is arranged offset relative to the first pin by at least 120° in the circumferential direction of the ring filter element. Here, the filter device according to the invention has the advantage that even with the system in a skewed position the liquid can be safely drained. In particular in the case of filter devices which are used in different applications in utility vehicles and also in stationary operation with different installation positions, the second pin is a major advantage since, when changing the (ring) filter element, because of the significantly lower level of the medium remaining in the filter device, the contamination of the clean region with unfiltered fuel or medium for all installation positions is excluded. In addition, the draining process on the whole can be accelerated by the second draining passage. By way of the at least two pins, an improved key-lock system can also be created by way of their shape and size, which contributes towards ensuring that only high-quality ring filter elements are inserted. In the case of a ring filter element having only one pin, a draining passage remains open and the filter device does not function. Even in the case of a ring filter element having two pins, these have to be matched to the associated draining passages in terms of position, size and shape in order to be able to ensure a perfect functioning of the filter device.

In an advantageous further development of the filter device according to the invention it is provided that the two pins are arranged offset relative to one another by approximately 180° in the circumferential direction, or that the two pins are arranged offset relative to one another by approximately 146° in the circumferential direction. By way of this, a reliable, quick and position-independent draining of the filter device can take place while on the other hand, by way of the selected arrangement angle, a simple and yet effective key-lock system can be created which enforces the use of authorised ring filter elements.

Practically, three pins are provided which are arranged offset relative to one another by approximately 120° in the circumferential direction. By way of this, a further improved draining of the filter housing during maintenance and a further improved key-lock system can be created.

In an advantageous further development of the filter device according to the invention it is provided that the at least two pins engage in two separate draining passages or in a part section of a common draining passage each. By way of two entirely separate draining passages, which lead to a tank separated from one another, the draining process can take place faster and even with clogged first or second draining passage. By way of a Y-shaped draining passage, which on both its Y-arms receives a pin each, a compact design can be achieved since two separate draining passages need not be provided.

In an advantageous further development of the solution according to the invention a dirt bowl with a water separate arranged therein is provided on the lower end disc, wherein the at least two pins are arranged on the dirt bowl. Here, the water separator arranged within the dirt bowl is preferentially formed as coalescer and simultaneously welded to the lower end disc of the ring filter element. Such a coalescer is able to collect and discharge water particles and thus filter out for example any water contents present in the fuel so that these cannot reach the internal combustion engine and cause corrosion damage there. In this case, the filter device can be formed for example as oil or fuel filter, wherein entirely generally a design as air filter is also conceivable. Here, the water separator is connected to the lower end disc of the ring filter element, in particular welded, and can because of this be exactly positioned and fixed prior to installation prior for the closing of the dirt bowl, which significantly simplifies the production process of the filter device according to the invention.

In a further advantageous embodiment of the solution according to the invention, a guide is provided on the filter housing bowl or on a function element arranged therein, along which at least one of the at least two pins is guided towards the passage during the installation of the ring filter element. Such a guide can be formed for example in the manner of a ramp which makes possible any insertion of the ring filter element so that the same, by means of the pin, slides along the guide into the associated passage and by way of this an always correct installation can be ensured. On the one hand, such a guide can be cost-effectively realised for example by way of a suitable injection mould and on the other hand ensures a significantly simplified handling of the filter device according to the invention, since the ring filter element can be inserted in the filter housing bowl in any rotary angle position and transferred into its correct position by a simple rotation. An incorrect installation of the ring filter element can thereby be reliably excluded.

Practically, the at least two pins have a different axial length and/or a different diameter, wherein the associated draining passage comprises a complementary inner diameter. By way of this, the key-lock system can be further refined.

In an advantageous further development, a dirt bowl with a water separator arranged therein is provided on the lower end disc, wherein at least three pins are provided, of which two, in the installation state of the ring filter element, engage in a respective draining passage and the third pin is designed hollow and communicatingly connected to an interior of the dirt bowl and engages in a disposal passage. Here, the dirt bowl is arranged on the lower end disc of the ring filter element, for example welded on, wherein the connecting pins are usually formed in one piece with the dirt bowl and an operation of the filter device is exclusively made possible in particular when the pins engage in the associated passages arranged on the filter housing bowl or on a function element. By way of one of the pins, which is hollow in design, the water collection space or the dirt collection space situated in the dirt bowl can be drained. This pin of hollow design thus makes possible draining water and/or dirt into a separate water/dirt collection space or into the surroundings, wherein in this case usually an activated charcoal filter is additionally provided, which filters out any hydrocarbon contents that may still be present in the separated water. The other pins, which are not designed hollow, serve for closing the draining passages and do not therefore sealingly engage in the same provided that the ring filter element is in its installed state. When the ring filter element is removed, these pins are pulled out of the draining passages as a result of which the filter housing can drain. By way of in particular a different axial length between the three pins it can be achieved that the pin engaging in the disposal passage is only pulled out of the same when the other pins have long been already pulled out of the associated draining passage so that the liquid still present in the filter housing can drain completely without there being the risk that the liquid enters the disposal passage at the same time.

The present invention is based, furthermore, on the general idea of indicating a ring filter element of a filter device described above which comprises an upper end disc and a lower end disc, wherein at least two projecting, connecting pins are provided, wherein the second pin is arranged offset relative to the first pin by at least 120° in the circumferential direction of the ring filter element. By way of this, draining without problem and also a rapid draining at the same time can be made possible even with a skewed position of the filter device. By way of the at least two pins, an improved key to a key-lock system can be created by their shape and size, which also contributes to ensuring that only high-quality ring filter elements are inserted.

In an advantageous further development of the ring filter element according to the invention it is provided that the two pins are arranged offset by approximately 180° relative to one another in the circumferential direction, or that the two pins are arranged offset relative to one another by approximately 146° in the circumferential direction. By way of this, a reliable, quick and position-independent draining of the filter device can take place on the one hand while by the selected arranged angle a simple yet effective key-lock system can be created on the other hand, which enforces using authorised ring filter elements.

In an advantageous further development of the solution according to the invention, a dirt bowl with a water separator arranged therein is provided on the lower end disc, wherein the at least two pins are arranged on the dirt bowl. Here, the water separator arranged within the dirt bowl is preferentially designed as coalescer and welded to the lower end disc of the ring filter element at the same time. Such a coalescer is able to collect and discharge water particles and thus filter out for example any water contents that may be present in the fuel so that the same cannot enter the internal combustion engine and cause corrosion damage there. Here, the water separator is connected to the lower end disc of the ring filter element, in particular welded, and because of this can be exactly positioned and fixed prior to the installation or before closing the dirt bowl, which significantly simplifies the production process of the filter device according to the invention.

Practically, the at least two pins have a different axial length and/or a different diameter, wherein the associated draining passage has a complementary inner diameter. By way of this, the key-lock system can be further refined.

In an advantageous further development, three pins are provided, of which two in the installed state of the ring filter element engage in a respective draining passage and the third pin is designed hollow and communicatingly connected to an interior of the dirt bowl and engages in a disposal passage. Here, the dirt bowl is arranged on the lower end disc of the ring filter element, for example welded, wherein the connecting pins are usually formed in one piece with the dirt bowl and an operation of the filter device is made possible exclusively in particular when the pins engage in the associated passages arranged on the filter housing bowl or on a function element. By way of one of the pins, which is formed hollow, the water drainage space or the dirt collection space located in the dirt bowl can thus be emptied. This pin of hollow design thus makes possible a water and/or dirt drainage into a separate water/dirt collection space or into the surroundings, wherein in this case usually an activated charcoal filter is additionally provided, which additionally filters out any hydrocarbon contents that may be present in the separated water.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

There it shows, in each case schematically.

DETAILED DESCRIPTION

Figure 1:
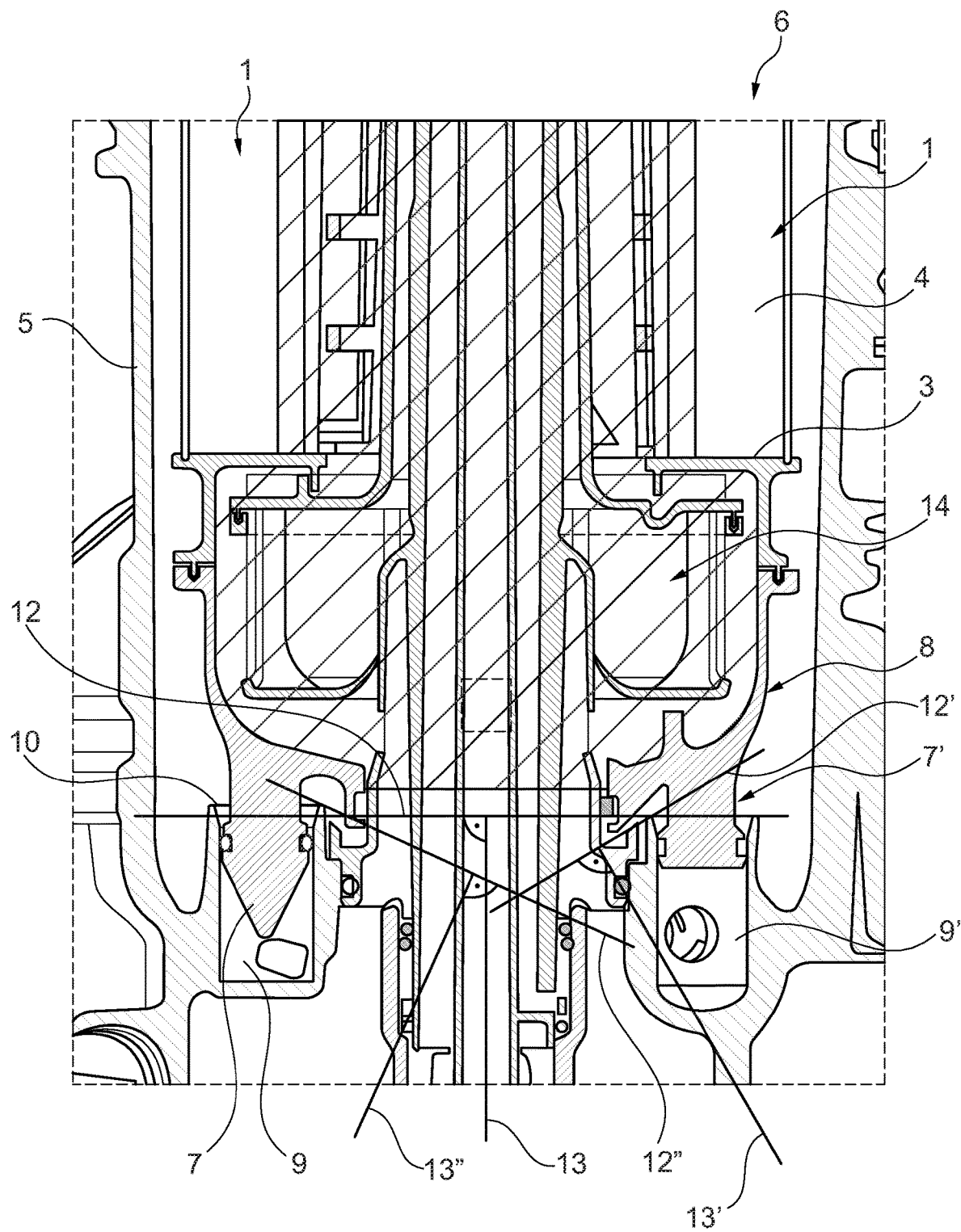
FIG. 1 a sectional representation through a filter device according to the invention, FIG. 2 a ring filter element according to the invention in a view.
Figure 2:
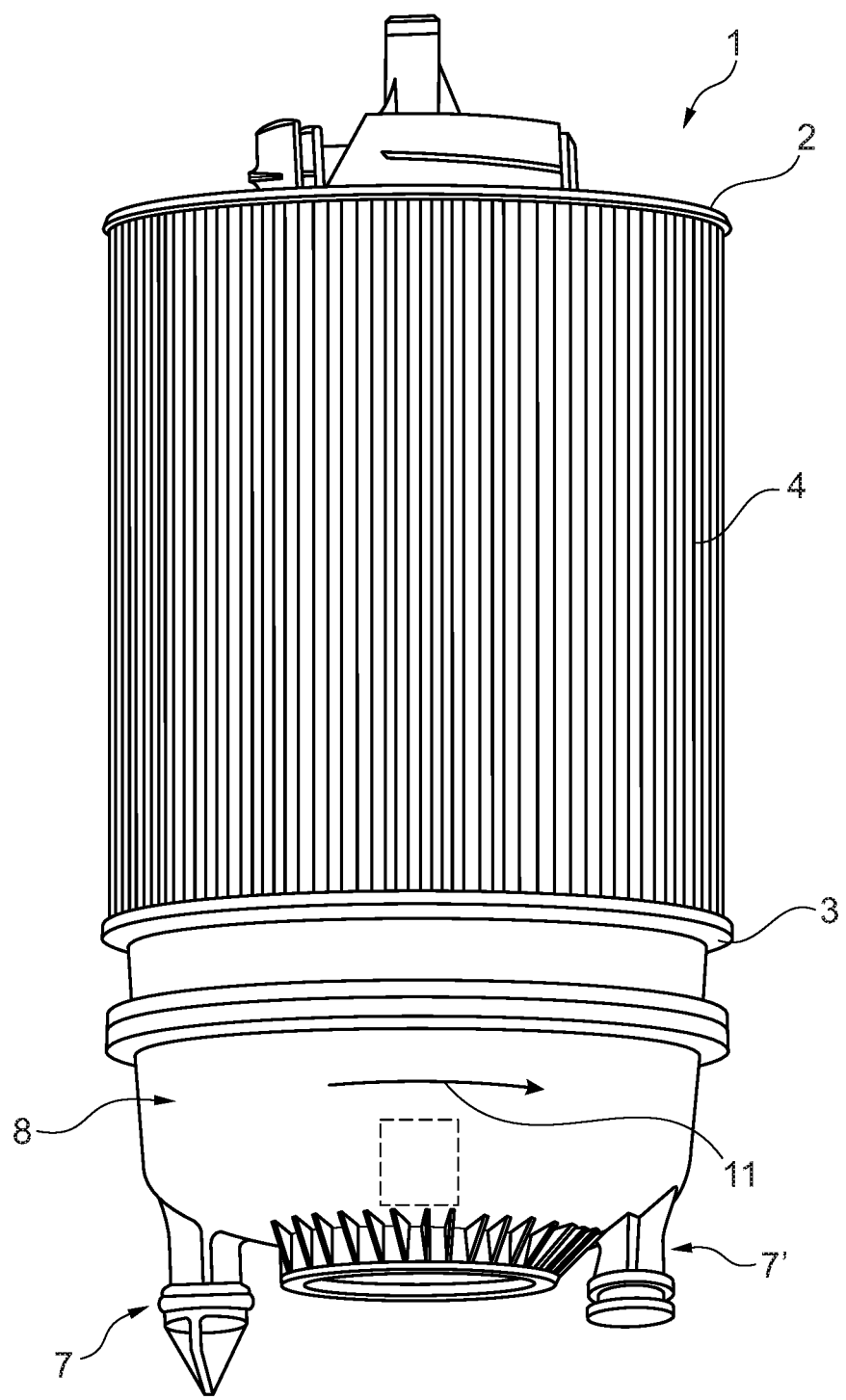

According to FIG. 2, a ring filter element 1 according to the invention comprises an upper end disc 2 and a lower end disc 3. Between the two end discs 2 and 3 a filter material 4, for example in the manner of a pleated star, is arranged. The filter element 1 is arranged upright in a filter housing bowl 5 of a filter device 6, for example of an oil or fuel filter, similar to the representation shown in FIG. 1. According to the invention, the ring filter element 1 now comprises at least two projecting, connecting pins 7, 7', both of which in the installed state engage in an associated draining passage 9, 9' each, wherein the second pin 7' is arranged offset by at least 120° in the circumferential direction 11 of the ring filter element 1 relative to the first pin 7.

According to FIGS. 1 and 2, the two pins 7, 7' are arranged offset relative to one another by approximately 180° in the circumferential direction 11, wherein it can also be provided that the two pins 7, 7' are arranged offset relative to one another by approximately 146° in the circumferential direction.

On the lower end disc 3, a dirt bowl 8 with a water separator that is not described in more detail arranged therein is provided. Projecting downwards, two connecting pins 7 and 7' are provided on the dirt bowl 8, which are formed, complementarily to two draining passages 9, 9' formed on the filter housing bowl 5 or on a function element insertable into the same, are provided. An operation of the complete filter device 6 is exclusively possible in particular when the pin 7 and the pin 7' engage in the draining passage 9 and in the draining passage 9' respectively.

Generally, the water separator can be formed as a so-called coalescer and welded to the lower end disc 3 of the ring filter element 1. The welding can take place for example by means of ultrasound welding, friction welding or laser welding and ensures a reliable positioning and fixing of the water separator on the lower end disc 3 of the ring filter element 1, so that in a following operation the dirt bowl 8 can be connected to the end disc 3, in particular welded.

The filter device 6 according to the invention has the great advantage that with a perpendicular installation 13, i.e. with an installation in which an axis of the ring filter element 1 is situated perpendicular, or in a skewed position 13', 13" of the system, in which the axis of the ring filter element 1 deviates from the perpendicular, a liquid level 12, 12' or 12" in the filter housing bowl 5 following the disassembly of the ring filter element 1 and draining of the liquid through the draining passages 9 and 9', is significantly below a clean region 14 in the interior of the ring filter element 1. Because of the significantly lower level of the liquid level 12, 12' and 12" of the liquid remaining in the filter device 6, the contamination of the clean region 14 (hatched region) with unfiltered fuel is excluded for all installation positions. Following this, the liquid can be safely drained and additionally the draining process as a whole accelerated because of the second draining passage 9'. By way of the at least two pins 7, 7', an improved key-lock system can also be created by their shape and size, which contributes towards ensuring that only high-quality ring filter elements 1 are inserted. With a ring filter element 1 having only a pin 7 or 7', a draining passage 9, 9' remains open and the filter device 6 does not function. Even with a ring filter element having two pins 7, 7', these have to be matched with respect to arrangement, size and shape to the associated draining passages 9, 9' in order to be able to ensure a perfect functioning of the filter device 6.

By way of the arrangement of the pins 7, 7' offset by approximately 180° or by approximately 146° in the circumferential direction relative to one another, a reliable, quick and position-independent draining of the filter device 6 can take place on the one hand and through the selected arrangement angle a simple but effective key-lock system created on the other hand, which favours using authorised ring filter elements 1.

In an advantageous further development of the filter device 6 according to the invention it is provided that the at least two pins 7, 7' engage in two separate draining passages 9, 9' or in a part section of a common draining passage 9 each. By way of two entirely separate draining passages 9, 9', which lead to a tank separated from one another, the draining process can take place more quickly. By way of a Y-shaped draining passage 9, which on its two Y-arms receives a pin 7, 7' each, a compact design can be achieved since two separate draining passages 9, 9' need not be provided.

In a further advantageous embodiment of the solution according to the invention, a guide 10 is provided on the filter housing bowl 5 or on a function element arranged therein, along which at least one of the two pins 7, 7' during the installation of the ring filter element 1 is guided towards the draining passage 9, 9'. Such a guide 10 can be formed for example in the manner of a ramp which makes possible any insertion of the ring filter element 1 so that the same, by means of the pins 7, 7', slides along the guide 10 into the associated draining passage 9, 9' and because of this an always correct installation can be ensured. An incorrect installation of the ring filter element 1 can thus be reliably excluded.

Practically, the at least two pins 7, 7' have a different axial length and/or a different diameter, wherein the associated draining passage 9, 9' has a complementary inner diameter. By way of this, the key-lock system can be further refined.

Practically, three pins 7, 7', 7" are provided, which are arranged offset by 120° relative to one another in the circumferential direction 11. By way of this, a further improved draining of the filter housing 5 during maintenance and a further improved key-lock system can be created. These can engage in associated not completely drawn draining passages 9, 9' and a further draining passage.

In an advantageous further development, three pins 7, 7', 7" are likewise provided, of which however only two, in the installed state of the ring filter element 1, engage in a respective draining passage 9, 9' and the third pin 7" is formed hollow and communicatingly connected to an interior of the dirt bowl 8 and engages in a disposal passage which is not shown. By way of the pin 7", which is formed hollow, the water collection space or the dirt collection space located in the dirt bowl 8 can thus be emptied. This pin 7" designed hollow thus makes possible a water and/or dirt drainage into a separate water/dirt collection space or into the surroundings, wherein in this case an activated charcoal filter is usually provided in addition, which filters out any hydrocarbon contents that may still be present in the separated water. The other pins 7, 7', which are not designed hollow, serve for closing the draining passages 9, 9' and thus sealingly engage in the same provided the ring filter element 1 is in its installed state. When the ring filter element 1 is removed, these pins 7, 7' are pulled out of the draining passages 9, 9' as a result of which the filter housing 5 can drain. By way of in particular a different axial length between the three pins 7, 7', 7" it can be achieved that the pin 7" engages in the disposal passage is only pulled out of the same when the other pins 7, 7' have long been pulled out of the associated draining passage 9, 9' already, so that the liquid that is still present in the filter housing 5 can drain completely without there being the risk that the liquid simultaneously enters the disposal passage.

The invention does not only relate to a complete filter device 6, consisting of filter housing and filter housing bowl 5 as well as function element and ring element 1 arranged therein, but also to the ring filter element 1 as a separate unit, in particular for the replacement parts market. Through the one-piece design of the ring filter element 1 together with the dirt bowl 8 and in particular through the one-piece design of the pins 7, 7' and of the dirt bowl 8, a complete part, in particular also for the replacement parts market, can thus be created which on the one hand is cost effective and which on the other hand ensures that no unsuitable and non-authorised makes are inserted which can weaken the filtering performance and thus cause damage under certain conditions.

The invention claimed is:

1. A filter device comprising:
   a filter housing; and
   a ring filter element arranged upright in the filter housing in an installed state, the ring filter element having an upper end disc and a lower end disc;
   wherein the ring filter element includes at least two projecting, connecting pins, each of which in the installed state engages in an associated draining passage to close off the associated draining passage to restrict water from draining from the filter device via the associated draining passage; and
   wherein one of the connecting pins is arranged offset relative to another of the connecting pins by at least 120° in a circumferential direction of the ring filter element.

2. The filter device according to claim 1, wherein one of:
   the at least two connecting pins are arranged offset by approximately 180° relative to one another in the circumferential direction; or
   the at least two connecting pins are arranged offset relative to one another by approximately 146° in the circumferential direction.

3. The filter device according to claim 1, wherein the at least two projecting, connecting pins includes three connecting pins, which are arranged offset relative to one another by approximately 120° in the circumferential direction.

4. The filter device according to claim 1, wherein the at least two projecting, connecting pins engage in two separate draining passages or in a part section of a common draining passage.

5. The filter device according to claim 1, wherein on the lower end disc a dirt bowl with a water separator arranged therein is provided, wherein the at least two projecting, connecting pins are arranged on the dirt bowl.

6. The filter device according to claim 5, wherein at least one of:
   the water separator is formed as a coalescer and welded to the lower end disc; and
   the dirt bowl is welded to the lower end disc.

7. The filter device according to claim 5, wherein the at least two projecting, connecting pins includes three connecting pins, two of which in the installed state engage in a respective associated draining passage, and the third pin is communicatingly connected to an interior of the dirt bowl and engages in a disposal passage such that water and/or dirt is drainable from the dirt bowl into the disposal passage.

8. The filter device according to claim 1, further comprising a guide on a filter housing bowl or on a function element, which guides at least one of the connecting pins to the associated draining passage.

9. The filter device according to claim 1, wherein the filter device is formed as an oil or as a fuel filter.

10. The filter device according to claim 1, wherein at least one of:
    the at least two projecting, connecting pins have a different axial length; and
    the at least two projecting, connecting pins have a different diameter, wherein the associated draining passage has a complementary inner diameter.

11. A ring filter element of a filter device, comprising:
    an upper end disc;
    a lower end disc; and
    at least two projecting, connecting pins, wherein one of the connecting pins is arranged offset relative to another of the connecting pins by at least 120° in a circumferential direction of the ring filter element;
    wherein each connecting pin is configured to close off an associated draining passage to restrict water from draining from the filter device via the associated draining passage; and.

12. The ring filter element according to claim 11, wherein:
    the one of the connecting pins is arranged offset relative to the other of the connecting pins by 146° in the circumferential direction; or
    the at least two connecting pins are arranged offset by approximately 180° relative to one another in the circumferential direction.

13. The ring filter element according to claim 11, wherein the at least two projecting, connecting pins includes three connecting pins, which are arranged offset relative to one another by approximately 120° in the circumferential direction.

14. The ring filter element according to claim 11, wherein at least one of:
    the at least two projecting, connecting pins have a different axial length; and
    the at least two projecting, connecting pins have a different diameter, wherein the associated draining passage has a complementary inner diameter.

15. The ring filter element according to claim 11, wherein:
    on the lower end disc a dirt bowl with a water separator arranged therein is provided, wherein the at least two projecting, connecting pins are arranged on the dirt bowl; and
    the at least two projecting, connecting pins includes three connecting pins, one of which is communicatingly connected to an interior of the dirt bowl and is configured such that water and/or dirt is drainable from the dirt bowl into a disposal passage.

16. The ring filter element according to claim 15, wherein the water separator is formed as a coalescer and welded to the lower end disc.

17. A filter device comprising:
   a filter housing; and
   a ring filter element arranged upright in the filter housing in an installed state, the ring filter element having:
      an upper end disc;
      a lower end disc; and
      three projecting, connecting pins, two of which in the installed state engage in an associated draining passage to close off the associated draining passage to restrict water from draining from the filter device via the associated draining passage;
   wherein the connecting pins are arranged offset relative to one another by approximately 120° in a circumferential direction of the ring filter element.

18. The filter device according to claim 17, wherein the two connecting pins engage in two separate draining passages or in a part section of a common draining passage.

19. The filter device according to claim 17, wherein:
   on the lower end disc a dirt bowl with a water separator arranged therein is provided, wherein the two connecting pins are arranged on the dirt bowl; and
   the third connecting pin is communicatingly connected to an interior of the dirt bowl such that water and/or dirt is drainable from the dirt bowl into the disposal passage.

20. The filter device according to claim 4, wherein the common draining passage is Y-shaped, and each part section is one of two Y-arms of the Y-shaped draining passage.

* * * * *